Patented June 29, 1948

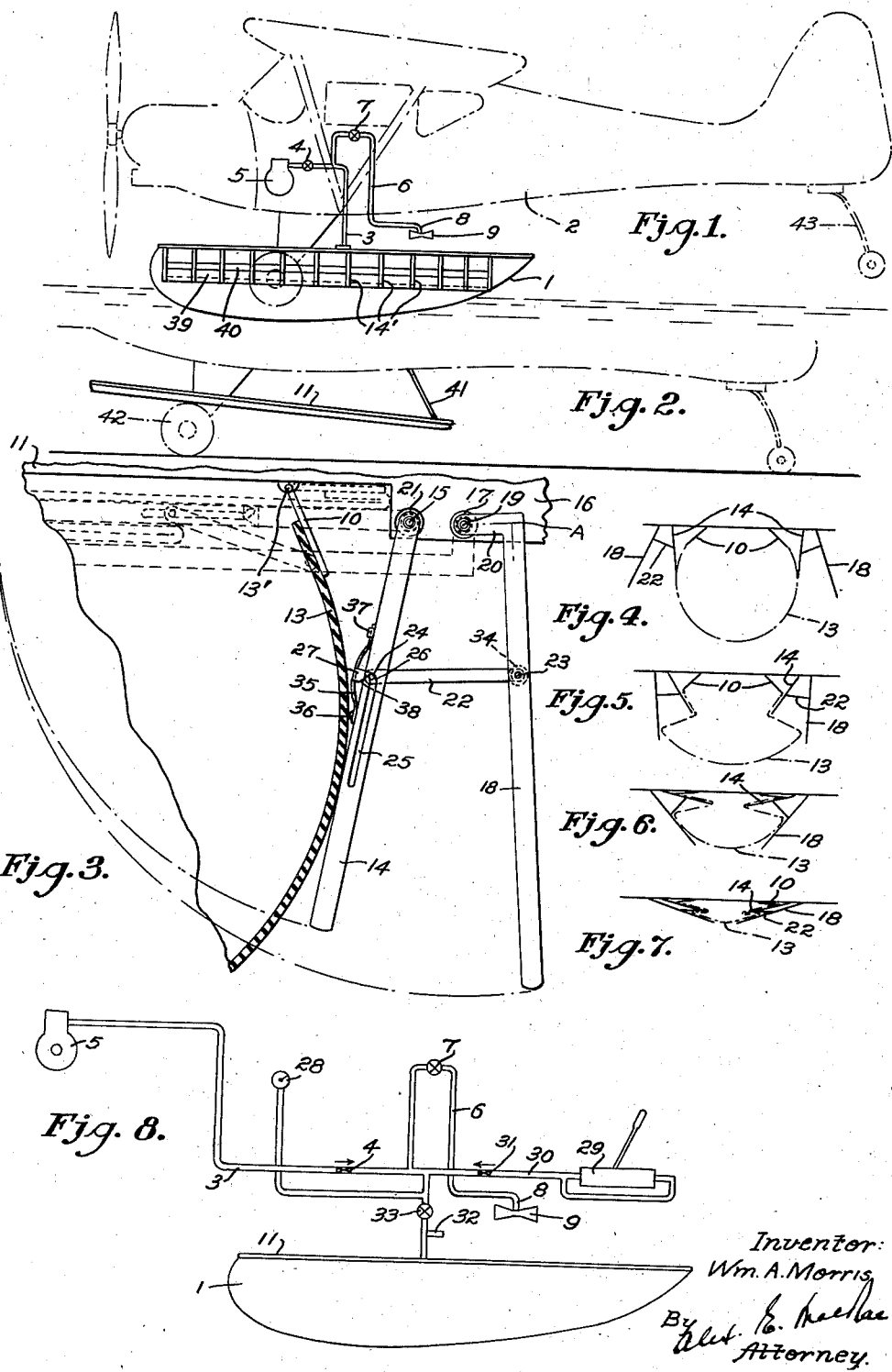

2,444,264

UNITED STATES PATENT OFFICE 2,444,264

AIRCRAFT PONTOON DEVICE

William A. Morris, Ottawa, Ontario, Canada

Application October 9, 1946, Serial No. 702,233

5 Claims. (Cl. 244—102)

This invention relates to aircraft pontoons of the collapsible type.

It has heretofore been proposed to provide an aircraft pontoon which may be collapsed or retracted in flight to reduce air resistance or, in association with the usual type of gear for land use, to permit utilization of such gear should it be advisable to land on the ground. However, such pontoons, due to complicated construction, have not been commercially practicable and thus, although the advantages of their use are great, they have had little commercial development.

It is an object of this invention to provide an aircraft pontoon and collapsing means therefor which is simple and inexpensive in construction and effective in operation.

To this end, the invention comprises an inflatable pontoon of flexible wall construction and means engaging the external surface of the pontoon and operable, in response to reduction of pressure within the pontoon to deflate the same, to fold the pontoon in a predetermined manner into a space of relatively small volume.

Other details, objects and advantages of the invention will become evident as the description proceeds with particular reference to the accompanying drawing, in which, Figure 1 is a side elevation showing the inflated pontoon in association with an aircraft, Figure 2 is a side elevation showing the pontoon in deflated and folded condition, Figure 3 is an enlarged detail view, in transverse elevation, showing the folding means, Figures 4, 5, 6 and 7 are diagrammatic views illustrating various stages in the folding operation, and Figure 8 is a diagram showing a proposed association of operating details.

In the drawing, 1 is a pontoon of which the usual pair is provided, suspended from an aircraft 2 in any suitable manner. The pontoon is constructed of any suitable flexible material, such as rubber and fabric, and air or other medium is supplied thereto to inflate the same by means of a conduit 3, having a valve 4, and communicating with a pump 5, preferably engine-driven. A branch conduit 6, having a valve 7 and an outlet 8, may be employed to evacuate the air in the pontoon and permit deflation of the same. A Venturi tube 9 may be connected to the outlet to accelerate the evacuation of air.

As shown, the pontoon comprises an upper rigid frame member 11 and a flexible member 13, the edges of which are stiffened to provide narrow rigid marginal portions 10, the outer edges of which have a swinging or hinged connection 13' with the frame. The rigid portions may be integrally formed with the flexible member or comprise separate elements attached to the flexible member, as shown.

The folding means comprises an arm 14 pivoted at 15 to a depending portion 16 of the frame 11 and means, which may comprise a spring 21 associated with the pivot 15 and acting to exert a lateral swinging movement on the arm in a direction towards the pontoon, against which the arm normally rests. A second arm 18, of slightly greater length than the first arm, is pivoted at 19 to the depending frame portion 16. The arm 18 is preferably offset from its pivot by means of the lateral extension 20 on the end of the arm. Means, which may comprise a spring 17, is associated with the pivot 19 to exert a swinging movement on the arm in a direction towards the pontoon. The swinging pressure or loading of arm 14 is preferably approximately double that of arm 18. A link 22 has a fixed pivot 23 in arm 18 and a sliding pivot 24 in a slot 25 in arm 14. Slot 25 has an offset portion 26 at the upper end thereof, into which the pivot 24 may enter. A spring 34 acting on the pivot 23 to urge the link 22 in an upward direction serves to maintain the pivot 24 in locked position in the portion 26. Means for releasing the pivot 24 from such locked position comprises a kick-off lug 27 carried by a flat spring 35 fixed at one end 36 to the inner edge of arm 14 and slidingly held by a bracket 37 at the other end. The lug has an inclined edge 38 which is positioned in laterally opposed relation to the pivot 24 when in locked position. When the spring and lug come in contact with a solid surface with sufficient force, they will be subjected to a downward movement and the inclined edge 38 will engage the pivot and move it into alignment with the main portion of the slot, thus permitting sliding movement of the pivot therealong. While the distance between the various pivotal points may be varied to meet requirements, the following ratios of such distances has been found satisfactory:

Distance between pivot 15 and pivot 19 = 1
Distance between point A at end of arm 18 opposite pivot 19 and pivot 23 = 3
Distance between pivot 15 and locked pivot 24 = 3.5
Distance between pivot 23 and locked pivot 24 = 3
Extent of movement of sliding pivot 24 (i. e. length of slot) = 2.5

The arms 14 and 18 may each comprise a plurality of separate members, as illustrated at 14' in Figure 1 connected, if desired by longitudinally extending members 39 and 40 for engagement with the pontoon, or they may each comprise a single platelike member extending substantially the length of the pontoon.

Referring to Figure 8 which illustrates diagrammatically one convenient means for inflating and deflating the pontoon, the valve 4 in the air conduit 3 is of the one-way type to permit passage of air under pressure from the engine-driven pump 5. A pressure gauge 28 may be provided in the air conduit 3. A hand pump 29 in a branch conduit 30 communicating with conduit 3 may be provided for use should the pump fail. A one-way valve 31 is located in conduit 30. If desired, an external feeding nipple 32 may be provided. A safety valve 33 is also located in conduit 3.

In operation, and referring to Figures 3 to 7, inclusive, on deflation of the pontoon, arms 14 and 18 will swing inwardly under the influence of the spring loading. Arms 14 will effect a folding action on the pontoon, as shown in Figure 5 swinging the pontoon rigid portions 10 outwardly towards the frame and drawing the lower portion of the pontoon upwardly for engagement with the arms 18, as shown in Figure 6. As arms 14 move into substantially horizontal position, as shown in dotted lines in Figure 3, the spring 35 is engaged by the folded flat surface of the pontoon and moves the kick-off lug 27 downwardly to release the pivot 24 from locked position. Thereafter arms 18 commence their effective folding movement on the lower portion of the pontoon as shown in Figure 7, and finally fold the pontoon into the substantially flat horizontal position shown in dotted lines in Figure 3. It will be observed that the folding means produces a substantially bellows-like folding action on the pontoon.

On inflation, the pontoon initially moves the arm 18 back to the point where the pivot 24 automatically enters its locked position in the slot, and thereafter moves arm 14, with arm 18, back to their original positions.

There has thus been provided a mechanically simple and operatively effective collapsing means for a pontoon. The usual landing gear 42 may be provided on the aircraft for use as desired. In order to accommodate the pontoons, the tail strap 43 may be lengthened as required. Recesses may be provided in the pontoons to accommodate the landing wheels, when the pontoons are in inflated condition.

The suspension support 41 for the pontoon may be hydraulically operated to raise or lower the rearward portion thereof to place the pontoon in inclined relation to the longitudinal axis of the aircraft when in deflated condition, as in Figure 2, or in substantially parallel relation thereto when inflated, as in Figure 1.

It will be understood that various changes may be made in the details described without departing from the spirit of the invention as defined in the appended claims. For instance, various means, including hydraulic rams and electrical means, may be employed to load the arms 14 and 18 for inward swinging movement in response to deflation of the pontoons.

What is claimed is:

1. In an aircraft pontoon having a frame and an inflatable and collapsible flexible portion depending from the frame, folding means therefor comprising arms pivotally suspended from the frame on each side of the flexible portion and in laterally opposed relation thereto and means responsive to deflation of the pontoon for swinging said arms inwardly into engagement with the external surface of said flexible portion to impart a bellows-like folding action thereto.

2. In an aircraft pontoon having a frame and an inflatable and collapsible flexible portion depending from the frame, folding means therefor comprising a pair of arms pivotally suspended from the frame, one on each side of said flexible portion, means urging said arms into contact with the external surface of said flexible portion, and a second pair of arms pivotally suspended from the frame in laterally spaced relation to the first arms and means biasing said second arms in the same direction as that of the adjacent first arm.

3. In an aircraft pontoon having a frame and an inflatable and collapsible flexible portion depending from the frame, folding means therefor comprising a pair of arms pivotally suspended from the frame, one on each side of the flexible portion and means biasing said arms in a direction towards the flexible portion to exert a folding action on an upper portion thereof in response to deflation of the flexible portion and a second pair of arms pivotally suspended from the frame, one on each side of the flexible portion and means biasing said second arms in a direction towards the flexible portion to exert a folding action on a lower portion thereof in response to deflation of the flexible portion.

4. In an aircraft pontoon having a frame and an inflatable and collapsible flexible portion depending from the frame, folding means therefor comprising a pair of arms each pivoted at one end to the frame laterally of the flexible portion, spring means for maintaining said arms in engagement with the lateral surfaces of the flexible portion, a second pair of arms each pivoted at one end to the frame laterally outwardly of the first arms, spring means for exerting a swinging movement to the second arms in a direction towards the first arms, a link connecting each of the first arms to the adjacent second arm, said link having a fixed position with relation to the arms to maintain the latter in spaced relation, and means for releasing the link from said fixed position.

5. In an aircraft pontoon having a frame and an inflatable and collapsible flexible portion depending from the frame, folding means therefor comprising a pair of spring-loaded arms pivotally suspended from the frame, one on each side of the flexible portion and biased in a direction towards the latter, a second pair of spring-loaded arms pivotally suspended from the frame, one on each side of the flexible portion and biased in a direction towards the latter, a link connecting each first arm with the adjacent second arm, said link having a pivot fixed in the second arm and a pivot slidably in the first arm, means for locking said sliding pivot with respect to the first arm, and a kick-off lug carried by each of said first arms to release it from locked position.

WILLIAM A. MORRIS.

REFERENCES CITED

The following references are of record in the file of this patent:

UNITED STATES PATENTS

| Number | Name | Date |
| --- | --- | --- |
| 2,306,269 | King | Dec. 22, 1942 |